United States Patent [19]
Di Maggio et al.

[11] Patent Number: 5,625,735
[45] Date of Patent: Apr. 29, 1997

[54] METHOD OF FIXING A POLARIZATION-PRESERVING OPTICAL FIBER AND FERRULE FOR A FIBER OF THIS KIND

[75] Inventors: Michel Di Maggio, Bonnelles; Christian Brot, Leuville sur Orge; Christian Duchet, Marcoussis, all of France

[73] Assignee: Alcatel N.V., Rijswijk, Netherlands

[21] Appl. No.: 542,726

[22] Filed: Oct. 13, 1995

[30] Foreign Application Priority Data

Oct. 14, 1994 [FR] France ................... 94 12292

[51] Int. Cl.⁶ .................... G02B 6/27; G02B 6/42
[52] U.S. Cl. .................... 385/91; 385/11; 385/78
[58] Field of Search .................... 385/11, 60, 66, 385/76–78, 80, 84, 88, 90, 91

[56] References Cited

U.S. PATENT DOCUMENTS

| | | | |
|---|---|---|---|
| 4,378,954 | 4/1983 | Baker | 385/80 |
| 4,907,853 | 3/1990 | Hiratsuka | 385/60 |
| 5,212,753 | 5/1993 | Maranto | 385/80 |
| 5,276,751 | 1/1994 | Grard et al. | 385/66 |

FOREIGN PATENT DOCUMENTS

| | | |
|---|---|---|
| 0266780A3 | 5/1988 | European Pat. Off. . |
| 0520902A1 | 12/1992 | European Pat. Off. . |
| 3615727A1 | 11/1987 | Germany . |

OTHER PUBLICATIONS

R. O. Miles et al, "Attaching Single–Mode Polarization–Preserving Fiber to Single–Mode Semiconductor Lasers", *Applied Optics*, vol. 23, No. 7, Apr. 1984, New York, US, pp. 1096–1099.

A. Ishikura et al, "Optimum Fusion Splice Method for Polarization–Preserving Fibers", *Applied Optics*, vol. 25, No. 19, 1 Oct. 1986, New York, US, pp. 3455–3459.

*Patent Abstracts of Japan*, vol. 9, No. 2 (P–325) Jan. 8, 1985 corresponding to JP–A–59 152 412 (Nippon Denki).

Primary Examiner—John D. Lee
Attorney, Agent, or Firm—Sughrue, Mion, Zinn, Macpeak & Seas

[57] ABSTRACT

In a method for fixing a polarization-preserving optical fiber the fiber is illuminated transversely and orientation of the polarization-preserving plane of the fiber is monitored by direct visual examination of internal components of the fiber rendered visible by such illumination. The illumination is effected through the wall of a transparent ferrule holding the fiber. The method has applications in fiber optical telecommunications systems.

3 Claims, 1 Drawing Sheet

METHOD OF FIXING A POLARIZATION-PRESERVING OPTICAL FIBER AND FERRULE FOR A FIBER OF THIS KIND

BACKGROUND OF THE INVENTION

1. Field of the Invention

The invention concerns a method of fixing a polarization-preserving optical fiber and a ferrule for a fiber of this kind.

2. Description of the Prior Art

Polarization-preserving optical fibers include internal components whereby they impose or at least preserve a linear polarization of the light that they guide. The plane defined by the axis of the fiber and this polarization is referred to hereinafter as the "polarization-preserving plane". These fibers are conventionally used in telecommunication systems when light received by an optical component must have a correct plane of polarization as defined by the component. To this end the light is guided to the component by a fiber of this kind.

The fixing of the fiber must then not only ensure alignment and correct longitudinal and transverse positioning of the end of the fiber relative to the component, but also coincidence of the polarization-preserving plane of the fiber and the polarization-plane defined by the component. To this end an operation is carried out to orient the polarization-preserving plane. It is difficult because the internal components of the fiber are all transparent, and so the direction of this plane cannot be determined merely by visual examination of the fiber.

In the usual case of a fiber imposing a linear polarization, unpolarized light has previously been injected into the fiber and the direction of the plane of polarization of the light leaving the end of the fiber determined. The fiber is then rotated about its axis to move this plane into the direction required for the polarization-preserving plane.

The optical fiber may be held in the conventional way in a capillary passage formed in a ceramic ferrule.

One object of the present invention is to simplify the operation of orienting the polarization-preserving plane of an optical fiber to be coupled to an optical component sensitive to that orientation.

SUMMARY OF THE INVENTION

To this end, the present invention consists in a method of fixing a polarization-preserving optical fiber wherein said fiber is illuminated transversely and orientation of the polarization-preserving plane of said fiber is monitored by direct visual examination of internal components of said fiber rendered visible by said illumination which is effected through the wall of a transparent ferrule holding said fiber.

How the present invention may be put into effect is explained hereinafter, by way of non-limiting example, with reference to the appended diagrammatic drawing. If the same component is shown in more than one figure it is always identified by the same reference symbol.

DETAILED DESCRIPTION OF THE PREFERRED EMBODIMENT

Figure 1:
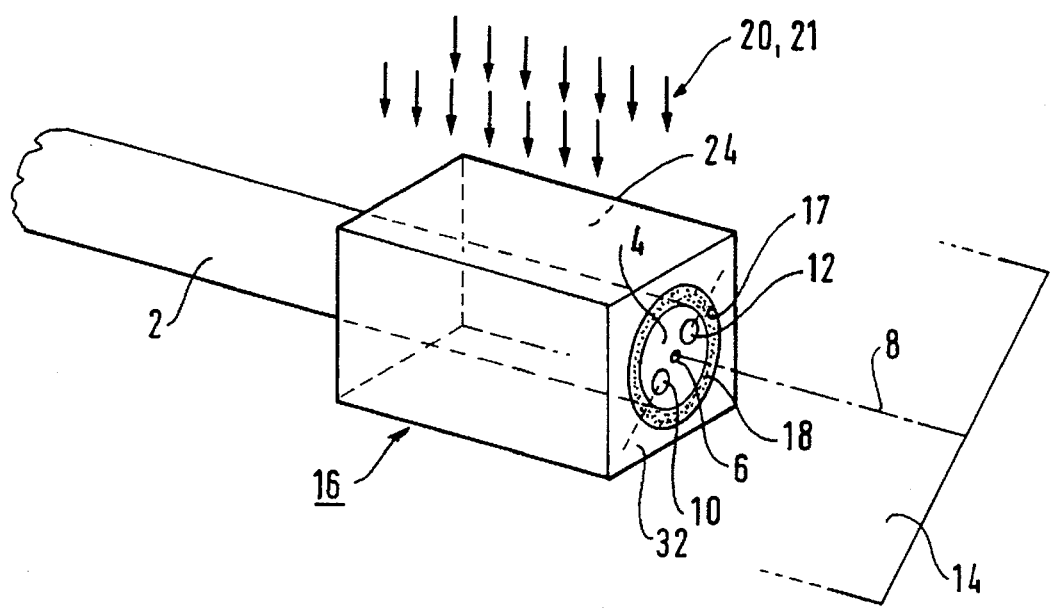
FIG. 1 is a perspective view of a polarization-preserving fiber in its ferrule.

A method in accordance with this invention includes the following operations that are known in themselves:

Insertion of an optical fiber 2 into a capillary passage 17 in a ferrule 16 for holding the fiber. The fiber has an axis 8, is made of transparent glass and includes internal components 10, 12 that are also transparent and define a polarization-preserving plane passing through the axis. The passage is surrounded by a wall of the ferrule and also has an axis. The axes of the fiber and the passage coincide and constitute a common axis.

Figure 2:
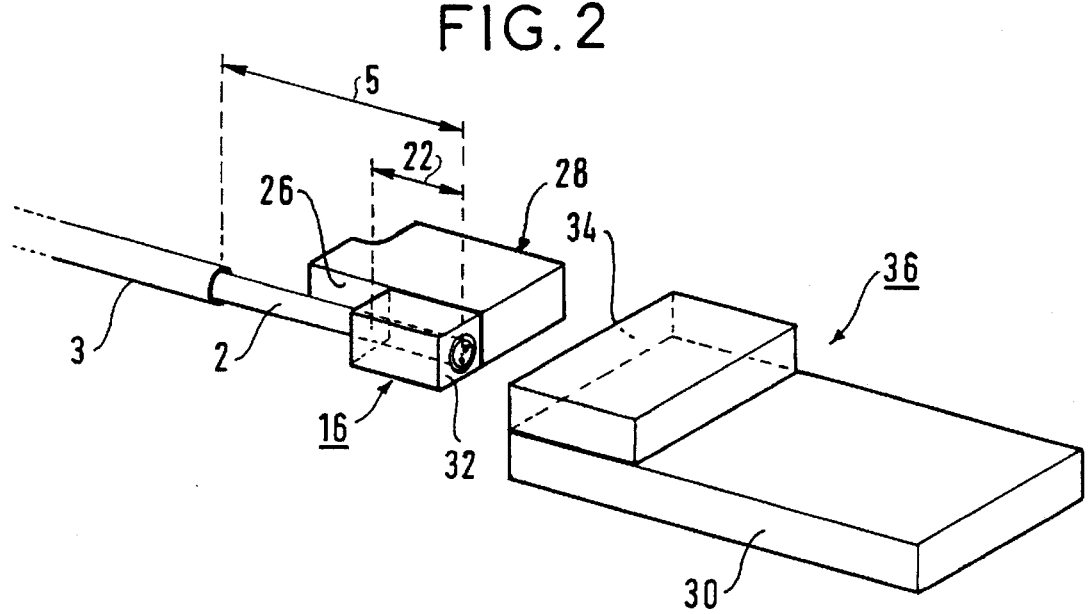
FIG. 2 is a perspective view showing the fiber, the ferrule, its support and an optical component to be coupled to the fiber.

The fiber 2 to be fixed is a silica fiber the plastics material sheath 3 of which can be seen in FIG. 2 and has been removed from an end section 5.

Its diameter is 125 μm, for example.

Its various components are differentiated by introducing doping impurities into the silica.

It has an optical cladding 4 and a core 6 disposed along its axis 8. It is of the "Panda" type, for example: its polarization-preserving properties are imparted to it by diametrally opposite silica rods 10 and 12 which introduce mechanical stresses into the fiber. These rods define a polarization-preserving plane 14.

Axial displacement of the fiber in the passage, after its insertion therein, so that a section of the fiber in the passage constitutes a fixing section 22 which is part of the end section 5.

Fixing of the fixing section to the ferrule after the above axial displacement, by means of an adhesive infiltrated into the passage. In the case of the present invention this adhesive is advantageously a resin 18 that can be cross-linked by exposure to ultraviolet light and the exposure is effected by passing a light beam 20 through the wall of the ferrule.

Finally, fixing of the ferrule to a ferrule support 28 relative to which the fiber must be fixed to enable it to be coupled to an optical component 30 fixed to or to be fixed to the support. The component can be fixed before or after the fiber is fixed to the ferrule.

The polarization-preserving plane of the fiber must be fixed so as to coincide with a polarization-plane imposed by the component and defined relative to the support. The two planes are rendered coincident by means of an operation to orient the polarization-preserving plane including rotation of the fiber relative to the support and/or to the ferrule about the common axis 8. This operation to orient the polarization-preserving plane must be effected after the fiber is inserted into the ferrule and before the fiber is fixed to the component by means of the ferrule and the ferrule support.

In accordance with the present invention the ferrule 16 is transparent. The operation of orienting the polarization-preserving plane then further entails illuminating the fixing section 22 of the fiber through the wall of the ferrule. Rotation of the fiber is monitored by visual examination of the internal components 10, 12 that are clearly visible at the end of the fiber.

The illumination is effected by means of a beam of visible light 20, 21 which is reflected to some degree from the surfaces of the ferrule and the fiber, and which is therefore rendered somewhat diffuse. The advantages of the present invention stem largely from the surprising fact that, by virtue of this diffuse illumination, components such as the rods 10 and 12 become visible and so show the direction of the polarization-preserving plane 14. The visibility of the rods is enhanced after introduction of the adhesive and if the ferrule has a plane face through which the illumination is effected.

The ferrule 16 has an angular indexing surface 24 parallel to the common axis 8 and cooperating with an angular indexing surface 26 of the ferrule support 28. This operation defines an angular position of the ferrule relative to the support in rotation about the common axis. The fiber is then rotated relative to the ferrule and the operations of orienting the polarization-preserving plane, fixing the fixing section 22 to the ferrule and fixing the ferrule to the ferrule support are carried out in that order. The angular indexing surfaces are advantageously plane surfaces. Specifically, the ferrule is in the shape of a prism, having a square cross-section, for example, one lateral face of the prism constituting the indexing surface.

Temporary fixing of the ferrule to its support is then readily effected by applying adhesive to this face.

The side length of the square is typically between 1 mm and 3 mm, for example 1.6 mm. The diameter of the passage 17 is 160 μm, for example.

The ferrule is made from glass containing silica and other standard metal oxides, for example.

The four lateral faces of the square cross-section prism that it constitutes are polished, likewise the end faces such as the face 32.

This end face is transverse to the common axis, typically perpendicular to that axis. It constitutes a fiber positioning face 32. The method of the invention then further includes the following operations:

Making a component unit 36 including said component 30 and having a plane face constituting a component locating face 34.

Placing the fiber locating face 32 and the component locating face 34 together.

Mutual sliding of the ferrule support 28 and the component unit 36, holding the locating faces 32 and 34 together, until a position of optimal coupling is obtained.

Finally, adhesive bonding of the fiber and component locating faces.

There is claimed:

1. A method of fixing a polarization-preserving optical fiber wherein said fiber is illuminated transversely and orientation of the polarization-preserving plane of said fiber is monitored by direct visual examination of internal components of said fiber rendered visible by said illumination which is effected through the wall of a transparent ferrule holding said fiber, said method comprising the steps of:

inserting an optical fiber into a capillary passage in a transparent ferrule for holding the fiber, said fiber having an axis, being made of transparent glass and including internal components that are also transparent and define a polarization-preserving plane passing through said axis, said passage being surrounded by a wall of said ferrule and also having an axis, the axes of said fiber and said passage coinciding and constituting a common axis, axially displacing said fiber in said passage, after its insertion therein, so that a section of said fiber in said passage constitutes a fixing section, fixing said fixing section to said ferrule after the above axial displacement, and fixing said ferrule to a ferrule support relative to which said fiber must be fixed to enable it to be coupled to an optical component fixed to or to be fixed to said support, said polarization-preserving plane of said fiber having to be fixed so as to coincide with a polarization plane imposed by said component and defined relative to said support, said two planes being rendered coincident by means of an operation to orient the polarization-preserving plane including rotation of said fiber relative to said support and/or to said ferrule about said common axis, this operation to orient said polarization-preserving plane having to be effected after said fiber is inserted into said ferrule and before said fiber is fixed to said component by means of said ferrule and said ferrule support, wherein said operation of orienting said polarization-preserving plane further entails illuminating said fixing section of said fiber through the wall of said ferrule, said rotation of said fiber being monitored by visual examination of said internal components of said fiber.

2. A method according to claim 1 wherein said ferrule has an angular indexing surface parallel to said common axis and cooperating with an angular indexing surface of said ferrule support to define an angular position of said ferrule relative to said support in rotation about said common axis, said fiber then being rotated relative to said ferrule and the operations of orienting said polarization-preserving plane, fixing said fixing section to said ferrule and fixing said ferrule to said ferrule support being carried out in that order.

3. A method according to claim 1 wherein said ferrule has an end face transverse to said common axis and constituting a fiber locating face, the method further including the following operations:

making a component unit including said component and having a plane face constituting a component locating face, placing said fiber locating face and said component locating face together, mutual sliding of said ferrule support and said component unit, holding said locating faces together, until a position of optimal coupling is obtained, and adhesive bonding of said fiber and component locating faces.

* * * * *